US012609749B2

(12) United States Patent (10) Patent No.: US 12,609,749 B2
Nilsson et al. (45) Date of Patent: Apr. 21, 2026

(54) POLARIZATION BASED BEAM SELECTION PROCESS

(71) Applicant: Telefonaktiebolaget LM Ericsson (publ), Stockholm (SE)

(72) Inventors: Andreas Nilsson, Gothenburg (SE); Pär Ankel, Nödinge (SE); Fredrik Athley, Västra Frölunda (SE); Sven Petersson, Sävedalen (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 316 days.

(21) Appl. No.: 18/037,739

(22) PCT Filed: Nov. 27, 2020

(86) PCT No.: PCT/EP2020/083780
§ 371 (c)(1),
(2) Date: May 18, 2023

(87) PCT Pub. No.: WO2022/111819
PCT Pub. Date: Jun. 2, 2022

(65) Prior Publication Data
US 2023/0412237 A1 Dec. 21, 2023

(51) Int. Cl.
*H04B 7/06* (2006.01)
*H04B 7/10* (2017.01)
*H04L 5/00* (2006.01)

(52) U.S. Cl.
CPC ........... *H04B 7/06952* (2023.05); *H04B 7/10* (2013.01); *H04L 5/0051* (2013.01)

(58) Field of Classification Search
CPC .... H04B 7/06952; H04B 7/10; H04B 7/0408; H04L 5/0051; H04L 5/0048
See application file for complete search history.

(56) References Cited

U.S. PATENT DOCUMENTS

2016/0242159 A1 8/2016 Ho et al.
2018/0288755 A1 10/2018 Liu et al.
(Continued)

FOREIGN PATENT DOCUMENTS

WO 2020/0167038 A1 8/2020

OTHER PUBLICATIONS

International Search Report and Written Opinion issued in International Application No. PCT/EP2020/083780 dated Sep. 21, 2021 (18 pages).
(Continued)

*Primary Examiner* — Vinncelas Louis
(74) *Attorney, Agent, or Firm* — Rothwell, Figg, Ernst & Manbeck, P.C.

(57) ABSTRACT
There is provided mechanisms for performing a beam selection process. A method is performed by a network node. The method comprises transmitting reference signals during the beam selection process. The beam selection process involves two consecutive beam sweeps to be performed using a set of direction beams. During each of the two consecutive beam sweeps the reference signals are sequentially transmitted in the set of direction beams as the directional beams are swept. During the two consecutive beam sweeps, the reference signals are in a first subset of the directional beams transmitted with a first polarization, and the reference signals are in a second subset of the directional beams transmitted with a second polarization.

17 Claims, 5 Drawing Sheets

(56) References Cited

U.S. PATENT DOCUMENTS

| 2019/0123798 A1 | 4/2019 | Lou et al. | |
| 2020/0028544 A1* | 1/2020 | Bengtsson | H04B 7/0408 |
| 2020/0274593 A1 | 8/2020 | Kim et al. | |
| 2020/0280409 A1 | 9/2020 | Grant et al. | |
| 2020/0351129 A1 | 11/2020 | Kwak et al. | |
| 2021/0184744 A1* | 6/2021 | Pezeshki | H04L 5/0048 |
| 2024/0334486 A1 | 10/2024 | Iyer et al. | |

OTHER PUBLICATIONS

Sony, "Enhancements on multi-beam operation", 3GPP TSG RAN WG1#98bis, R1-1910750, Chongqing, China, Oct. 14-20, 2019 (7 pages).

Sony, "Considerations on multi-beam operation", 3GPP TSG RAN WG1 Ad-Hoc Meeting 1901, R1-1900378, Taipei, Taiwan, Jan. 21-25, 2019 (8 pages).

Tateishi, K., et al., "Indoor Experiment on 5G Radio Access Using Beam Tracking at 15 GHz Band," 2016 IEEE 27th Annual International Symposium on Personal, Indoor, and Mobile Radio Communications (PIMRC): Workshop: Inclusive Radio Communication Networks for 5G and Beyond 9RACON2016), 2016 (6 pages).

International Search Report and Written Opinion issued in International Application No. PCT/EP2020/083775 dated Sep. 21, 2021 (17 pages).

Qualcomm Incorporated, "Remaining details on synchronization signal design", 3GPP TSG RAN WG1 Meeting NR#3, R1-1716378, Sep. 18-21, 2017, Nagoya, Japan (9 pages).

CATT, "Consideration on beam management", 3GPP TSG RAN WG1 Meeting 90bis, R1-1717812, Prague, CZ, Oct. 9-13, 2017 (10 pages).

3GPP TS 38.331 V16.2.0 (Sep. 2020), 3rd Generation Partnership Project; Technical Specification Group Radio Access Network; NR; Radio Resource Control (RRC) protocol specification (Release 16), Sep. 2020 (921 pages).

3GPP TS 38.214 V16.3.0 (Sep. 2020), 3rd Generation Partnership Project; Technical Specification Group Radio Access Network; NR; Physical layer procedures for data (Release 16), Sep. 2020 (166 pages).

Office Action issued in U.S. Appl. No. 18/037,660 on Sep. 8, 2025 (26 pages).

Intel Corp, "On beam management issued for multi-CC operation," 3GPP document R1-1802393, Feb. 2018 (7 pages).

* cited by examiner

100

162a

140

110

162b

200

300a

300b

120

130

150a

P-1:

140

172a

300a

160a

P-2:

140

172a

300a

162a

180a

P-3:

140

300a

Beam sweep *k*            Beam sweep *k*+1

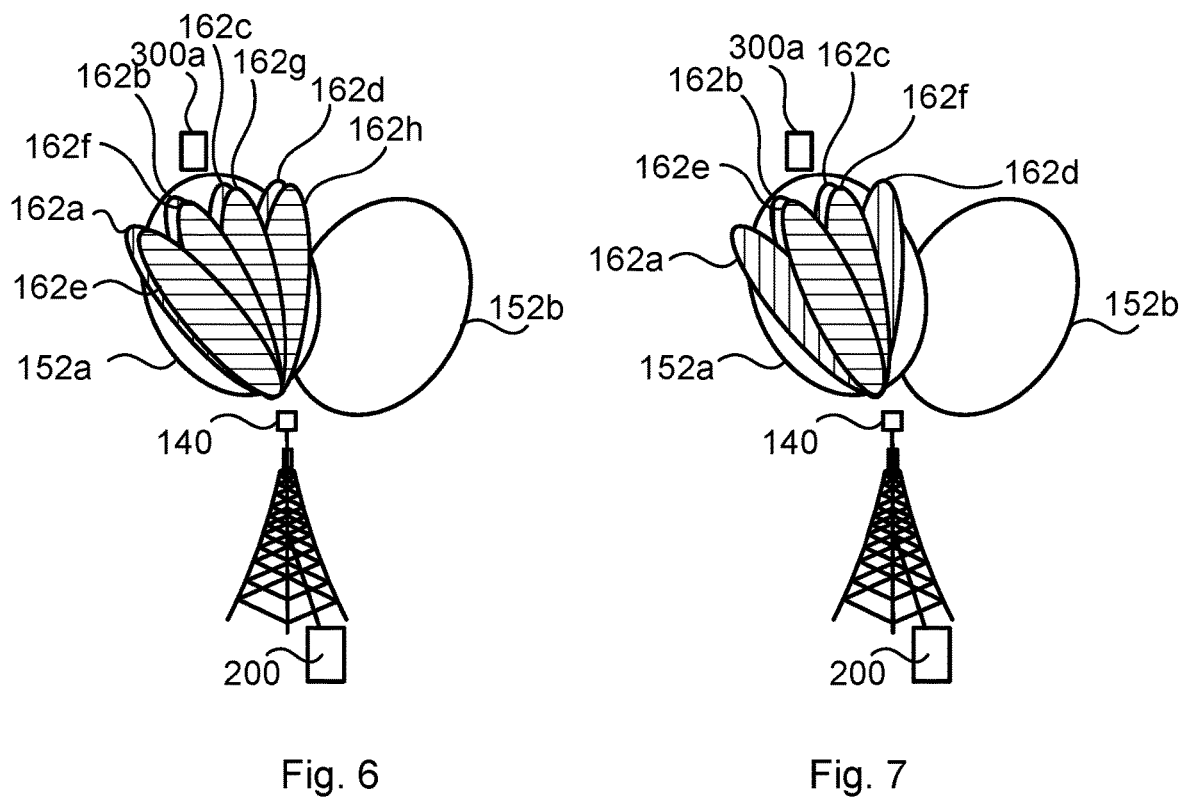
Fig. 6
Fig. 7
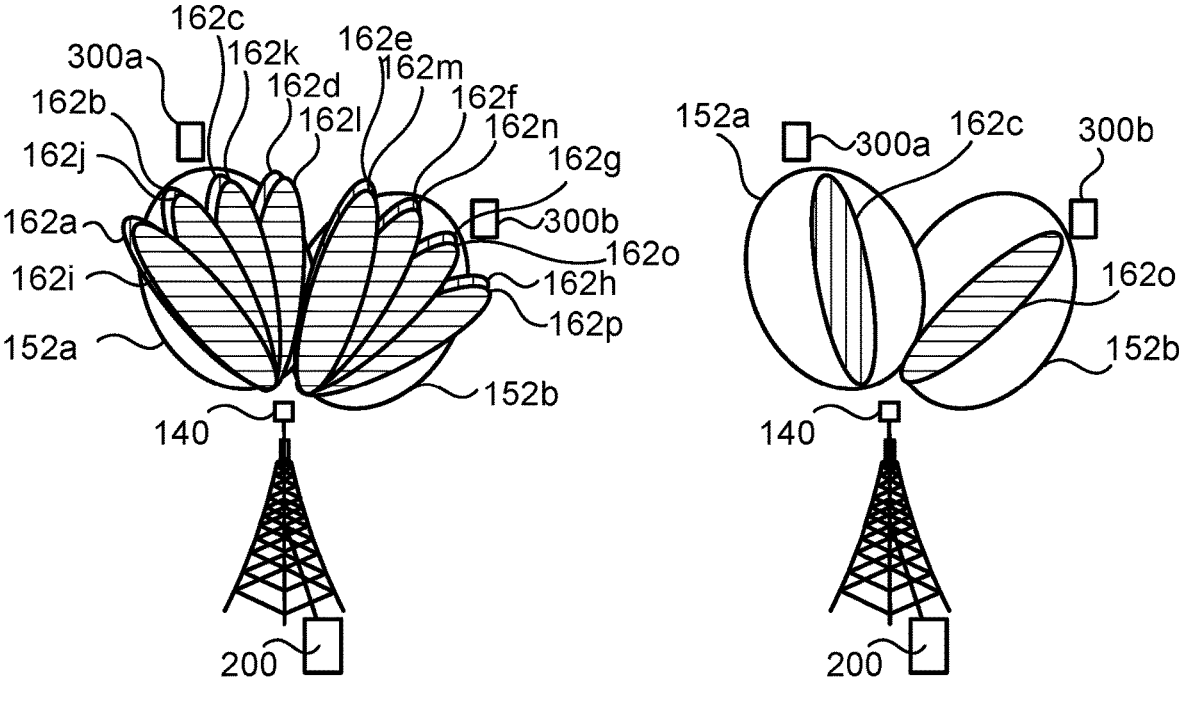
Fig. 8
Fig. 9

POLARIZATION BASED BEAM SELECTION PROCESS

CROSS REFERENCE TO RELATED APPLICATIONS

This application is a 35 U.S.C. § 371 National Stage of International Patent Application No. PCT/EP2020/083780, filed Nov. 27, 2020, designating the United States.

TECHNICAL FIELD

Embodiments presented herein relate to a method, a network node, a computer program, and a computer program product for performing a beam selection process.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimetre wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the user-end (as represented by a user equipment), which typically is referred to as a beam pair link (BPL). A BPL (i.e. both the beam used by the network node and the beam used by the user equipment) is expected to be discovered and monitored by the network using measurements on downlink reference signals, such as channel state information reference signals (CSI-RS) or SSBs, used for beam management.

A beam selection procedure can be used for discovery and maintenance of beam pair links. In some aspects, the beam selection procedure is defined in terms of a P-1 sub-procedure, a P-2 sub-procedure, and a P-3 sub-procedure.

The CSI-RS for beam management can be transmitted periodically, semi-persistently or aperiodically (event triggered) and they can be either shared between multiple user equipment or be device-specific. The SSB are transmitted periodically and are shared for all user equipment. In order for the user equipment to find a suitable network node beam, the network node, during the P-1 sub-procedure, transmits the reference signal in different transmission (TX) beams on which the user equipment performs measurements, such as reference signal received power (RSRP), and reports back the N best TX beams (where N can be configured by the network). Furthermore, the transmission of the reference signal on a given TX beam can be repeated to allow the user equipment to evaluate a suitable reception (RX) beam. Reference signals that are shared between all user equipment served by the TRP might be used to determine a first coarse direction for the user equipment. It could be suitable for such a periodic TX beam sweep at the TRP to use SSB as the reference signal. One reason for this is that SSB are anyway transmitted periodically (for initial access/synchronization purposes) and SSBs are also expected to be beamformed at higher frequencies to overcome the higher propagation losses noted above.

A finer beam sweep in more narrow beams than used during the P-1 sub-procedure might then be performed at the network node during a P-2 sub-procedure to determine a more detailed direction for each user equipment. Here, the CSI-RS might be used as reference signal. As for the P-1 sub-procedure, the user equipment performs measurements, such as reference signal received power (RSRP), and reports back the N best TX beams (where N can be configured by the network).

Furthermore, the CSI-RS transmission in the transmission beam selected during the P-2 sub-procedure can be repeated in a P-3 sub-procedure to allow the user equipment to evaluate suitable RX beams at the user equipment.

However, there is still a risk for polarization mismatching. In turn, this could result in that that the optimal TX beam and/or RX beam (i.e., the TX beam and/or RX beam yielding highest throughput, signal to interference plus noise ratio (SINR), etc.) is not selected during the beam selection procedure.

Hence, there is still a need for an improved, in terms of yielding selection of optimal TX beam and/or RX beam, beam selection procedure.

SUMMARY

An object of embodiments herein is to enable reliable quality measurements to be obtained by the network node for use, e.g., during a beam selection procedure.

According to a first aspect there is presented a network node for performing a beam selection process. The network node comprises processing circuitry. The processing circuitry is configured to cause the network node to transmit reference signals during the beam selection process. The beam selection process involves two consecutive beam sweeps to be performed using a set of direction beams. During each of the two consecutive beam sweeps the reference signals are sequentially transmitted in the set of direction beams as the directional beams are swept. During the two consecutive beam sweeps, the reference signals are in a first subset of the directional beams transmitted with a first polarization, and the reference signals are in a second subset of the directional beams transmitted with a second polarization.

According to a second aspect there is presented a method for performing a beam selection process. The method is performed by a network node. The method comprises transmitting reference signals during the beam selection process. The beam selection process involves two consecutive beam sweeps to be performed using a set of direction beams. During each of the two consecutive beam sweeps the reference signals are sequentially transmitted in the set of direction beams as the directional beams are swept. During the two consecutive beam sweeps, the reference signals are in a first subset of the directional beams transmitted with a first polarization, and the reference signals are in a second subset of the directional beams transmitted with a second polarization.

According to a third aspect there is presented a network node for performing a beam selection process. The network node comprises a transmit module configured to transmit reference signals during the beam selection process. The beam selection process involves two consecutive beam sweeps to be performed using a set of direction beams. During each of the two consecutive beam sweeps the reference signals are sequentially transmitted in the set of direction beams as the directional beams are swept. During the two consecutive beam sweeps, the reference signals are in a first subset of the directional beams transmitted with a first polarization, and the reference signals are in a second subset of the directional beams transmitted with a second polarization.

According to a fourth aspect there is presented a computer program for performing a beam selection process. The computer program comprises computer program code which, when run on a network node, causes the network node to perform a method according to the second aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects enable reliable quality measurements to be obtained by the network node for use, e.g., during a beam selection procedure.

Advantageously, these aspects enable the network node to perform reliable directional beam selection. In turn, this will improve coverage for both downlink and uplink signals, for using single-user multiple input multiple output (MIMO) as well as multi-user multiple input multiple output (MU-MIMO) techniques.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 4, 5, 6, 7, 8, and 9 schematically illustrate transmission of reference signals from a network node according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figures 1, 2:
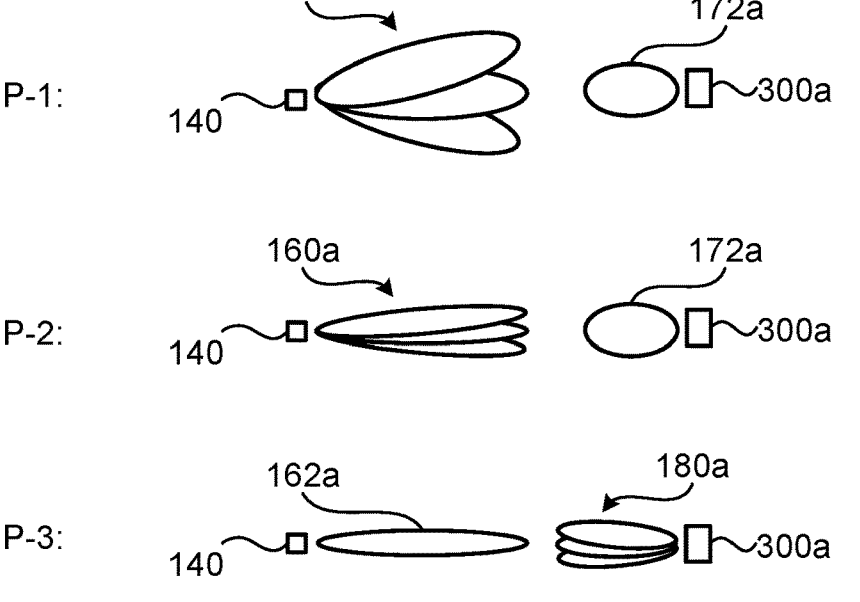
FIG. 1 is a schematic diagram illustrating a communication network according to embodiments.
FIG. 2 schematically illustrates a beam selection procedure according to an embodiment.

FIG. 1 is a schematic diagram illustrating a communication network 100 where embodiments presented herein can be applied. The communication network 100 could be a third generation (3G) telecommunications network, a fourth generation (4G) telecommunications network, a fifth generation (5G) telecommunications network, or any evolvement thereof, and support any 3GPP telecommunications standard, where applicable.

The communication network 100 comprises a network node 200 configured to provide network access to user equipment, as represented by user equipment 300a and user equipment 300b, in a radio access network 110. The radio access network 110 is operatively connected to a core network 120. The core network 120 is in turn operatively connected to a service network 130, such as the Internet. The user equipment 300a, 300b are thereby enabled to, via the network node 200, access services of, and exchange data with, the service network 130.

The network node 200 comprises, is collocated with, is integrated with, or is in operational communications with, a transmission and reception point (TRP) 140. The network node 200 (via its TRP 140) and the user equipment 300a, 300b are configured to communicate with each other in directional beams, as illustrated at reference numerals 162a, 162. In this respect, directional beams that could be used both as TX beams and RX beams will hereinafter simply be referred to as directional beams.

Examples of network nodes 200 are radio access network nodes, radio base stations, base transceiver stations, Node Bs, evolved Node Bs, gNBs, access points, access nodes, and backhaul nodes. Examples of user equipment 300a, 300b are wireless devices, mobile stations, mobile phones, handsets, wireless local loop phones, smartphones, laptop computers, tablet computers, network equipped sensors, network equipped vehicles, and so-called Internet of Things devices.

FIG. 2 schematically illustrates a beam selection procedure consisting of three sub-procedures, referred to as P-1, P-2, and P-3 sub-procedures. These three sub-procedures will now be disclosed in more detail with reference to one of the user equipment 300a, 300b.

One main purpose of the P-1 sub-procedure is for the network node 200 to find a coarse direction towards the user equipment 300a by transmitting reference signals in wide, but narrower than sector, beams that are swept over the whole angular sector. The TRP 140 is expected to, for the P-1 sub-procedure, utilize beams, according to a spatial beam pattern 150a, with rather large beam widths. During the P-1 sub-procedure, the reference signals are typically transmitted periodically and are shared between all user equipment 300a, 300b served by the network node 200 in the radio access network 110. The user equipment 300a uses a wide, or even omni-directional beam for receiving the reference signals during the P-1 sub-procedure, according to a spatial beam pattern 172a. The reference signals might be periodically transmitted channel state information reference signals (CSI-RS) or synchronization signal blocks (SSB). The user equipment 300a might then to the network node 200 report the N≥1 best beams and their corresponding quality values, such as reference signal received power (RSRP) values. The beam reporting from the user equipment 300a to the network node 200 might be performed rather seldom (in order to save overhead) and can be either periodic, semi-persistent or aperiodic.

One main purpose of the P-2 sub-procedure is to refine the beam selection at the TRP 140 by the network node 200 transmitting reference signals whilst performing a new beam sweep with more narrow directional beams, according to a spatial beam pattern, or set of directional beams, 160a, than those beams used during the P-1 sub-procedure, where the new beam sweep is performed around the coarse direction, or beam, reported during the P-1 sub-procedure. Hence, the beams in the set of directional beams 160a are not omni-directional. During the P-2 sub-procedure, the user equip-ment 300a typically uses the same beam as during the P-1 sub-procedure, according to a spatial beam pattern 172a. The user equipment 300a might then to the network node 200 report the N≥1 best beams and their corresponding quality values, such as reference signal received power (RSRP) values. One P-2 sub-procedure might be performed per each user equipment 300a or per each group of user equipment 300a, 300b. The reference signals might be periodically, aperiodically or semi-persistently transmitted CSI-RS. The P-2 sub-procedure might be performed more frequently than the P-1 sub-procedure in order to track movements of the user equipment 300a and/or changes in the radio propagation environment.

One main purpose of the P-3 sub-procedure is for terminal device 300a utilizing analog beamforming, or digital wide-band (time domain beamformed) beamforming, to find its own best beam. During the P-3 sub-procedure, the reference signals are transmitted, according to a spatial beam pattern, defined by directional beam 162a, in the best reported beam of the P-2 sub-procedure whilst the user equipment 300a performs a beam sweep, according to a spatial beam pattern 180a. Directional beam 162a is thus one of the directional beams 162a:162p in the set of beams 160a. The P-3 sub-procedure might be performed at least as frequently as the P-2 sub-procedure in order to enable the user equipment 300a to compensate for blocking, and/or rotation.

One alternative way for the user equipment 300a to find its own best directional beam, instead of the network node 200 transmitting reference signals during a P-3 sub-proce-dure, is to let the user equipment 300a evaluate different own direction beams during periodic transmission of refer-ence signals, such as SSBs, for example during the P-1 sub-procedure. Since each SSB consists of four orthogonal frequency-division multiplexing (OFDM) symbols, a maxi-mum of four directional beams at the user equipment 300a can be evaluated during each SSB transmission.

One drawback, however, with the user equipment 300a finding its own best directional beam based on transmission of SSBs is that an SSB only has one port (while CSI-RS can be transmitted with two ports), and hence the SSB is only transmitted over one single polarization (in each unique direction). This implies that the user equipment 300a, 300b most likely only will evaluate suitable directional beams for one polarization. In case of polarization fading there is a risk that a less than optimal directional beam is selected by the user equipment 300a.

As noted above, there is still a need for an improved, in terms of yielding selection of optimal directional beams, beam selection procedure In this respect, messages transmitted over a wireless link from the network node 200 (via the TRP 140) to the user equipment 300a, 300b can be broadly classified as control messages or data messages. Control messages are used to facilitate the proper operation of the overall communication network 100 as well as proper operation of each user equipment 300a, 300b. Control messages could comprise commands to control functions such as the transmitted power from a user equipment 300a, 300b, signaling of resource blocks within which data is to be received by the user equipment 300a, 300b or transmitted from the user equipment 300a, 300b towards the network node 200 (via the TRP 140), etc. Control messages could be transmitted on a physical downlink control channel (PDCCH) which for example carry scheduling information and power control messages. Depending on what control information that is conveyed in the PDCCH, different downlink control infor-mation (DCI) formats can be used. The messages sent on the PDCCH could be demodulated using the PDCCH demodu-lation reference signals (DMRS) that are frequency multi-plexed with the DCI. This means that the PDCCH defines a self-contained transmission.

This in turn enables beamforming of the PDCCH. PDCCH signalling is transmitted with a single port, hence in a single polarization. Since polarization mismatching can become severe (more than 10 dB), this can lead to problems with PDCCH coverage.

In case polarization mismatch occurs between the net-work node 200 and the user equipment 300a, 300b the beam selection might become un-reliable, which can lead to less than optimal beam selections at the network node 200. This will affect not only transmissions on the PDCCH, but all other uplink and downlink signals which are transmitted/received using the determined directional beam determined during the P-2 sub-procedure.

The embodiments disclosed herein therefore relate to mechanisms for performing a beam selection process. In order to obtain such mechanisms there is provided a network node 200, a method performed by the network node 200, a computer program product comprising code, for example in the form of a computer program, that when run on a network node 200, causes the network node 200 to perform the method.

Figure 3:
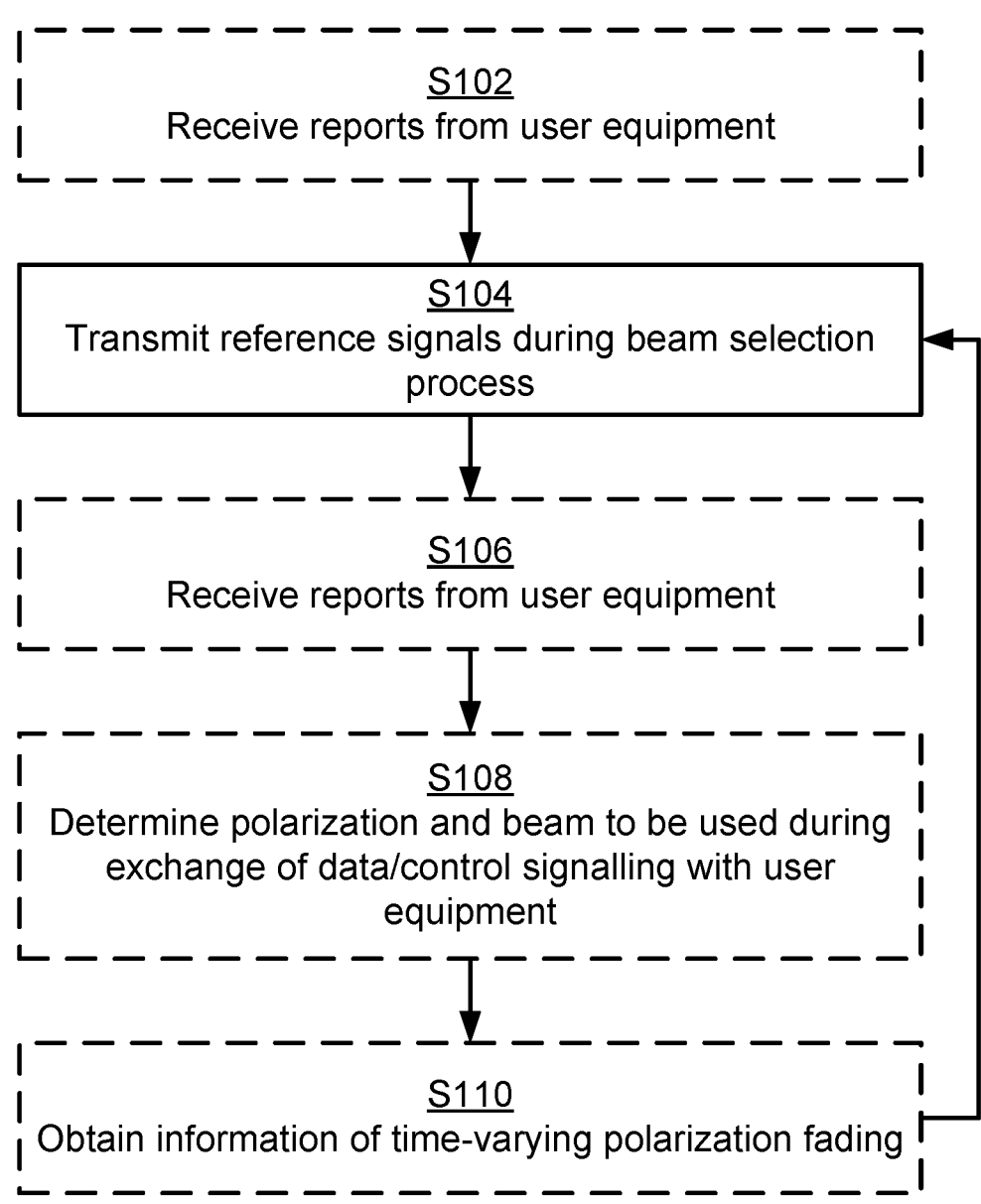
FIG. 3 is a flowchart of methods according to embodiments.

FIG. 3 is a flowchart illustrating embodiments of methods for performing a beam selection process. The methods are performed by the network node 200. The methods are advantageously provided as computer programs 1220.

S104: The network node 200 transmits reference signals during the beam selection process.

The beam selection process involves two consecutive beam sweeps 190a, 190b to be performed using a set 160a of direction beams 162a:162p.

During each of the two consecutive beam sweeps 190a, 190b the reference signals are sequentially transmitted in the set 160a of direction beams 162a:162p as the directional beams 162a:162p are swept.

During the two consecutive beam sweeps 190a, 190b, the reference signals are in a first subset of the directional beams transmitted with a first polarization, and the reference signals are in a second subset of the directional beams transmitted with a second polarization.

Advantageously, this method enables reliable quality measurements to be obtained by the network node 200 for use, e.g., during the beam selection procedure.

Advantageously, this method enables the network node 200 to perform reliable directional beam selection. In turn, this will improve coverage for both downlink and uplink signals, for using single-user multiple input multiple output (MIMO) as well as multi-user multiple input multiple output (MU-MIMO) techniques.

Embodiments relating to further details of performing a beam selection process as performed by the network node 200 will now be disclosed.

There might be different examples of reference signals that are transmitted in action S104. In some embodiments, each of the reference signals is a single-port CSI-RS.

In some embodiments, the first polarization and the second polarization are mutually orthogonal with respect to each other.

There might be different relations between the first subset of the directional beams and the second subset of the directional beams. In some embodiments, the first subset and the second subset are non-overlapping. That is, each directional beam is either part of the first subset or the second subset but not part of both the first subset and the second subset. In some embodiments, the first subset and the second subset are partly but not fully overlapping. That is, at least one directional beam, but not all directional beams, is part of both the first subset and the second subset, and at least one directional beam, but not all directional beams is either part of the first subset or the second subset but not part of both the first subset and the second subset. In some embodiments, the first subset and the second subset are fully overlapping. That is, each directional beam is part of both the first subset and the second subset.

There might be different ways to enable the reference signals to, during the two consecutive beam sweeps 190a, 190b, be transmitted in a first subset of the directional beams transmitted with a first polarization, and be transmitted in a second subset of the directional beams with a second polarization. In some aspects, the polarization switches within one and the same beam sweep. That is, in some embodiments, the reference signals are transmitted in both the first subset and the second subset during each of the two beam sweeps 190a, 190b. In other aspects, the polarization switches between two consecutive beam sweeps.

In some aspects, which directional beams to be used in each beam sweep is determined at least partly based on earlier reports from the user equipment 300a, 300b of previous references signals having been transmitted by the network node 200. In some examples, the previously transmitted reference signals are SSBs. That is, in some embodiments, the network node 200 is configured to perform (optional) action S102:

S102: The network node 200 receives, from user equipment 300a, 300b served by the network node 200, reports of reference signals having previously been transmitted by the network node 200.

Which of the directional beams to be included in the first subset of the directional beams and which of the directional beams to be included in the second subset of the directional beams are then determined based on the reports.

Figure 4:
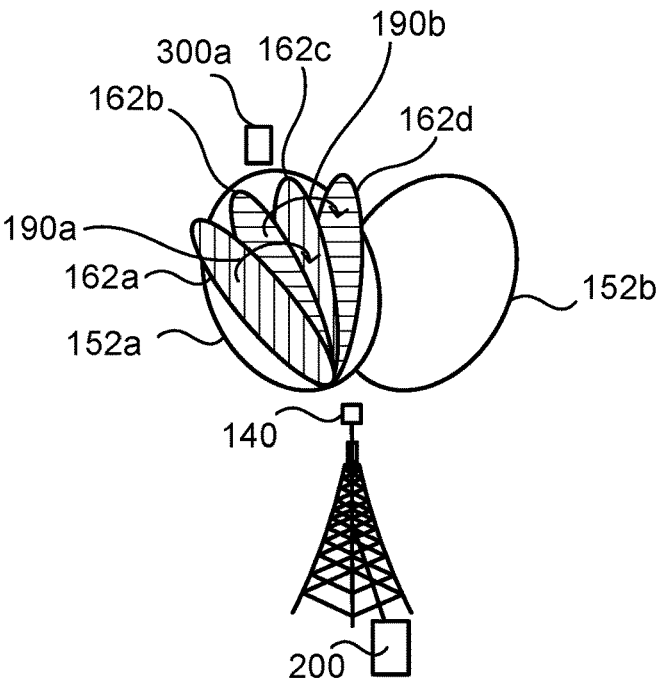

Reference is now made to FIG. 4. FIG. 4 illustrates transmission of reference signals in directional beams 162a: 162d from TRP 140 of network node 200 towards user equipment 300a. Directional beams 162a:162d are confined within the angular interval of directional beam 152a. The transmission of reference signals in directional beams 162a: 162d can thus represent a P-2 sub-procedure where reference signals during a preceding P-1 sub-procedure first having been transmitted in directional beams 152a and 152b. FIG. 4 represents an embodiment where the first subset is angularly composed of every second beam in the set 160a of direction beams 162a:162p and the second subset is composed of all remaining beams in the set 160a of direction beams 162a:162p. In some examples, in each of the two consecutive beam sweeps 190a, 190b the reference signals are alternatingly transmitted using a beam in the first subset and a beam in the second subset. In the example of FIG. 4, the reference signal transmitted in directional beam 152a thus has been reported by user equipment 300a as having higher quality than the reference signal transmitted in directional beam 152b. The network node 200 therefore performs a P-2 sub-procedure with four narrow directional beams 162a:162d confined within directional beam 152a. In FIG. 4 is thus shown transmission of reference signals during a beam selection process, where during two consecutive beam sweeps 190a, 190b, the reference signals are in a first subset, defined by directional beams 162a, 162c, of the directional beams transmitted with a first polarization, and the reference signals are in a second subset, defined by directional beams 162b, 162d, of the directional beams transmitted with a second polarization. In the illustrative example of FIG. 4, every second directional beam 162a, 162c of the P-2 sub-procedure is thus transmitted with a first polarization, and the other half of the directional beams, i.e., directional beams 162b, 162d, are transmitted with a second polarization. Assume that there exists a polarization mismatch for the first polarization, leading to 15 dB higher path loss for a signal transmitted with the first polarization compared to the second polarization. Without use of the herein disclosed inventive concept, this might lead to unreliable quality measurements of a P-2 sub-procedure where reference signals are transmitted only with the first polarization, causing unreliable and less than optimal beam selections. In turn, this might affect reliability of control signal as well as the throughput of data communication using the selected beam. With the example of FIG. 4, however, since two neighboring directional beams are transmitted with a mutually orthogonal polarization, user equipment 300a will still be able to find a directional beam with sufficiently high quality for the second polarization when polarization mismatch is experienced for the first polarization, and vice versa. This would avoid potentially large fading dips due to polarization mismatching and hence improve reliability of control signal as well as the throughput of data communication.

Figure 5:
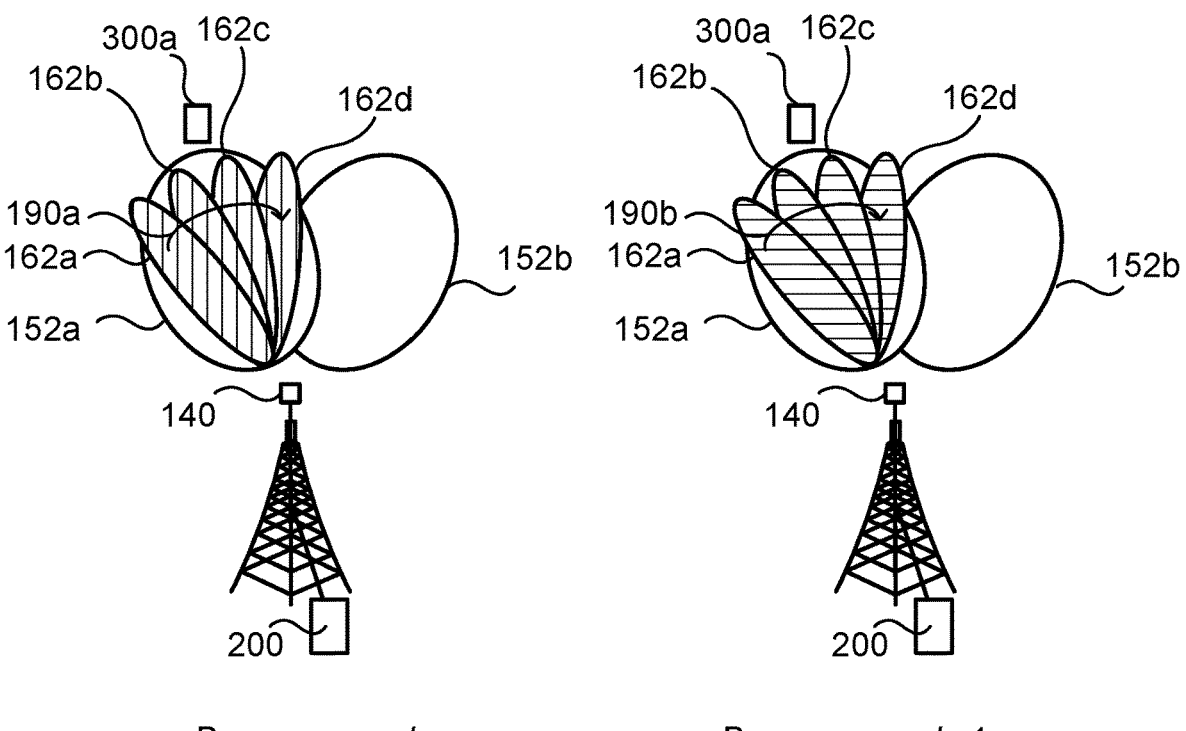

Reference is now made to FIG. 5. FIG. 5 illustrates transmission of reference signals in directional beams 162a: 162d from TRP 140 of network node 200 towards user equipment 300a in a similar manner as in FIG. 4. The difference is that, as illustrated in FIG. 5, during two consecutive beam sweeps 190a, 190b (denoted beam sweep k and beam sweep k+1 in FIG. 5), the reference signals are in a first subset, defined by all directional beams 162a:162d, of the directional beams transmitted with a first polarization, and the reference signals are in a second subset, defined by all directional beams 162a:162d, of the directional beams transmitted with a second polarization. FIG. 5 represents an embodiment where the reference signals are transmitted in only the first subset during a first beam sweep 190a of the two consecutive beam sweeps 190a, 190b and the reference signals are transmitted in only the second subset during a second beam sweep 190b of the two consecutive beam sweeps 190a, 190b. FIG. 5 illustrates an example where the polarization is switched between every consecutive beam sweeps 190a, 190b. That is, in beam sweep k, all reference signals are transmitted with a first polarization, and in beam sweep k+1, all reference signals are transmitted with a second polarization, for odd values of k. That is k=1, 3, 5, 7, . . . . This allows the network node 200 to combine reports from the user equipment 300a of two consecutive P-2 sub-procedures and based on those two reports determine the directional beam with both highest quality and best polarization. In this way, the beam selection becomes more robust to polarization mismatch since the user equipment 300a performs quality measurements on all directions beams 162a:162d in each of the two polarizations. This would avoid potentially large fading dips due to polarization mismatching and hence improve reliability of control signal as well as the throughput of data communication.

In one alternate of the example of FIG. 5, if the time stability of the polarization fading in the radio propagation channel is substantially longer than the periodicity of the beam sweep, the polarization is not switched between every consecutive beam sweeps 190a, 190b. Instead, the reference signals are transmitted in one polarization, corresponding to the polarization of the most recently selected directional beam, and only occasionally is the polarization switched between two consecutive beam sweeps 190a, 190b. This alternative of FIG. 5 represents an embodiment where the beam selection process involves at least a further consecutive beam sweep to be performed using the set 160a of direction beams 162a:162d, wherein this at least further consecutive beam sweep occurs after a second beam sweep 190b of the two consecutive beam sweeps 190a, 190b, and where during this at least further consecutive beam sweep the reference signals are transmitted in only the second subset. Such a switch could be performed in order to detect if any ongoing polarization fading has changed. In particular, in some embodiments, the network node 200 is configured to perform (optional) action S110:

S110: The network node 200 obtains information of time-varying polarization fading in a radio propagation environment between the network node 200 and user equipment 300a, 300b intended to receive the reference signals.

During how many further consecutive beam sweeps reference signals are transmitted in only the second subset then depends on how fast the time-varying polarization fading varies in the radio propagation environment. Hence, as illustrated by the arrow in FIG. 3 from action S110 to action S104, the information of time-varying polarization fading could be used as feedback as to how the reference signals are to be transmitted in a next occurrence of action S104. For example, if the first polarization is determined to yield highest quality for the reference signals, them for the next X beam sweeps (where X takes an integer value that is larger than 1) the reference signals are in all directional beams 162a:162d transmitted only with the first polarization, and for the X+1:th beam sweep the network node 200 switches to the second polarization so as to again perform a beam sweep using the second polarization and thus to again evaluate the second polarization.

Reference is now made to FIG. 6. FIG. 6 illustrates transmission of reference signals in directional beams 162a: 162h from TRP 140 of network node 200 towards user equipment 300a in a similar manner as in FIG. 4 and in FIG. 5. The difference is that, as illustrated in FIG. 6, during each of two consecutive beam sweeps, the reference signals are in a first subset, defined by directional beams 162a:162d, of the directional beams transmitted with a first polarization, and the reference signals are in a second subset, defined by directional beams 162e:162h, of the directional beams transmitted with a second polarization. FIG. 6 represent an embodiment where the first subset and the second subset are fully overlapping and the reference signals are transmitted in both the first subset and the second subset during each of the two beam sweeps 190a, 190b. Directional beams 162a and 162e have same direction and beam width, so has directional beams 162b and 162f, directional beams 162c and 162g, and directional beams 162d and 162h. FIG. 6 thus illustrates an example where all directional beams 162a:162h are transmitted with both polarizations.

Reference is now made to FIG. 7. FIG. 7 illustrates transmission of reference signals in directional beams 162a: 162f from TRP 140 of network node 200 towards user equipment 300a in a similar manner as in FIG. 6. Here it is assumed that the currently used directional beam for communicating with user equipment 300a is one of directional beams 162b, 162c in which a first polarization is used. Hence the network node 200 only evaluates directional beams 162e, 162f for a second polarization in close angular vicinity to directional beams 162b, 162c. FIG. 7 represents an embodiment where one of the beams in the set 160a of direction beams 162a:162d is a currently used beam for communication with user equipment 300a served by the network node 200, where the second subset comprises less number of beams than the first subset, and where the second subset overlaps with the first subset for the currently used beam and for beams angularly adjacent to the currently used beam. One difference compared to FIG. 6 thus is that, as illustrated in FIG. 7, the second subset, defined by directional beams 162e, 162f, comprises less number of beams than the first subset, defined by directional beams 162a: 162d, and where the second subset overlaps with the first subset for the currently used beam and for beams angularly adjacent to the currently used beam. This is a way to save overhead compared to the example illustrated in FIG. 6.

Reference is now made to FIG. 8. FIG. 8 illustrates transmission of reference signals in directional beams 162a: 162p from TRP 140 of network node 200 towards user equipment 300a and user equipment 300b in a similar manner as in FIG. 6. The difference is that, as illustrated in FIG. 8, one beam sweep in each of two polarizations is performed for each of two user equipment 300a, 300b. In this example, the network node 200 thus performs two beam sweeps (one per user equipment 300a, 300b), where during each beam sweep reference signals of both the first polarization and the second polarization are transmitted. In this way the network node 200 can determine a suitable directional beam and polarization for each respective user equipment 300a, 300b. It should here be mentioned that any of the examples and embodiments disclosed with reference to FIGS. 4, 5, 6, and 7 can also be used for this purpose.

In some examples, as illustrated in FIG. 9, the network node 200 uses the information obtained during the beam sweeps to determine a respective directional beam and polarization for each served user equipment 300a, 300b. In particular, in some embodiments, the network node 200 is configured to perform (optional) actions S106 and S108:

S106: The network node 200 receive reports from user equipment 300a, 300b served by the network node 200 of the reference signals.

S108: The network node 200 determines polarization and directional beam 162a:162p to be used during exchange of data and/or control signalling with the user equipment 300a, 300b until a next occurrence of the beam selection process is performed.

The network node 200 might then schedule the user equipment 300a, 300b either using frequency division multiplexing (FDM) and/or spatial division multiplexing (i.e. using MU-MIMO techniques). In one example of this embodiment, as illustrated in FIG. 9, both polarization and beam 162a:162p as determined for a first user equipment 300a differ from polarization and beam 162a:162p as determined for a second user equipment 300b. In the example of FIG. 9, directional beam 162c with the first polarization is used for communication with user equipment 300a, whilst directional beam 162o with the first polarization is used for communication with user equipment 300b.

Figure 10:
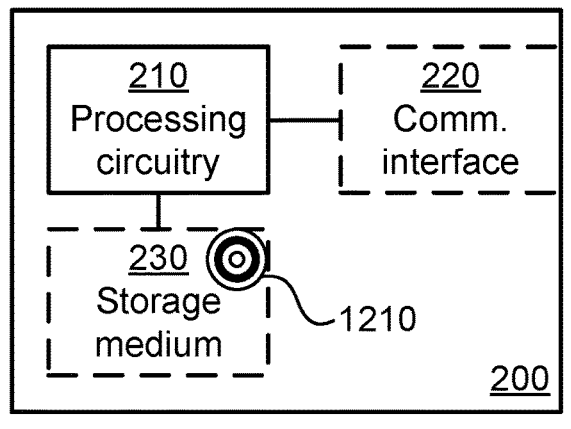
FIG. 10 is a schematic diagram showing functional units of a network node according to an embodiment.

FIG. 10 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210 (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or actions, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, functions, nodes, and devices, as illustrated in FIGS. 1, 2, 4, 5, 6, 7, 8, and 9. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 11:
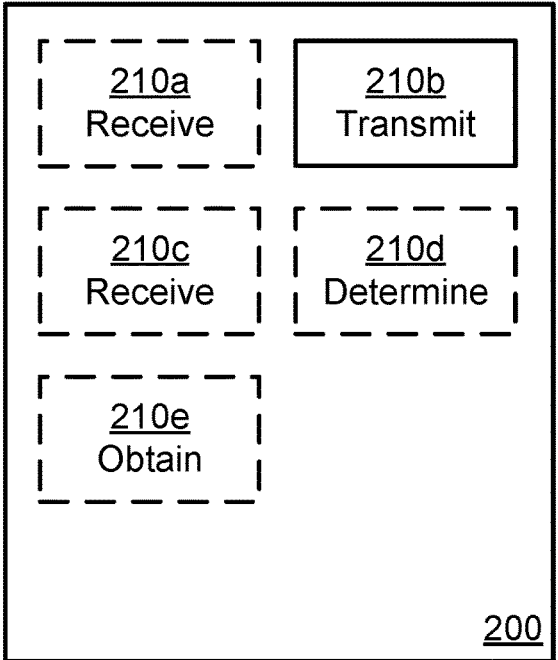
FIG. 11 is a schematic diagram showing functional modules of a network node according to an embodiment.

FIG. 11 schematically illustrates, in terms of a number of functional modules, the components of a network node 200 according to an embodiment. The network node 200 of FIG. 11 comprises a transmit module 210b configured to perform action S104. The network node 200 of FIG. 11 may further comprise a number of optional functional modules, such as any of a receive module 210a configured to perform action S102, a receive module 210c configured to perform action S106, a determine module 210d configured to perform action S108, and a obtain module 210e configured to perform action S110. In general terms, each functional module

210a:210e may in one embodiment be implemented only in hardware and in another embodiment with the help of software, i.e., the latter embodiment having computer program instructions stored on the storage medium 230 which when run on the processing circuitry makes the network node 200 perform the corresponding actions mentioned above in conjunction with FIG. 11. It should also be mentioned that even though the modules correspond to parts of a computer program, they do not need to be separate modules therein, but the way in which they are implemented in software is dependent on the programming language used. Preferably, one or more or all functional modules 210a:210e may be implemented by the processing circuitry 210, possibly in cooperation with the communications interface 220 and/or the storage medium 230. The processing circuitry 210 may thus be configured to from the storage medium 230 fetch instructions as provided by a functional module 210a:210e and to execute these instructions, thereby performing any actions as disclosed herein.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 10 the processing circuitry 210 may be distributed among a plurality of devices, or nodes. The same applies to the functional modules 210a:210e of FIG. 11 and the computer program 1220 of FIG. 12.

Figure 12:
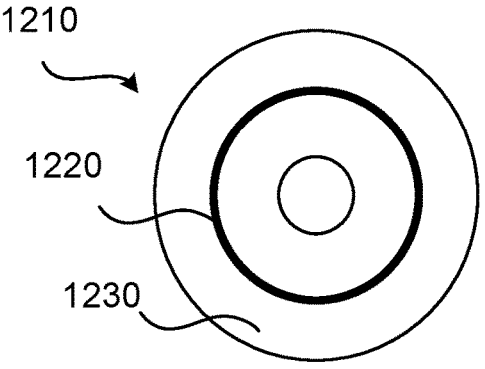
FIG. 12 shows one example of a computer program product comprising computer readable storage medium according to an embodiment.

FIG. 12 shows one example of a computer program product 1210 comprising computer readable storage medium 1230. On this computer readable storage medium 1230, a computer program 1220 can be stored, which computer program 1220 can cause the processing circuitry 210 and thereto operatively coupled entities and devices, such as the communications interface 220 and the storage medium 230, to execute methods according to embodiments described herein. The computer program 1220 and/or computer program product 1210 may thus provide means for performing any actions as herein disclosed.

In the example of FIG. 12, the computer program product 1210 is illustrated as an optical disc, such as a CD (compact disc) or a DVD (digital versatile disc) or a Blu-Ray disc. The computer program product 1210 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220 is here schematically shown as a track on the depicted optical disk, the computer program 1220 can be stored in any way which is suitable for the computer program product 1210.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A network node for performing a beam selection process, the network node comprising processing circuitry, the processing circuitry being configured to cause the network node to:

transmit reference signals during the beam selection process, wherein the beam selection process involves two consecutive beam sweeps to be performed using a set of direction beams, during each of the two consecutive beam sweeps the reference signals are sequentially transmitted in the set of direction beams as the directional beams are swept, and during the two consecutive beam sweeps, the reference signals are in a first subset of the directional beams transmitted with a first polarization, and the reference signals are in a second subset of the directional beams transmitted with a second polarization.

2. The network node of claim 1, wherein each of the reference signals is a single-port channel state information reference signal, CSI-RS.

3. The network node of claim 1, wherein the first polarization and the second polarization are mutually orthogonal with respect to each other.

4. The network node of claim 1, wherein the first subset and the second subset are non-overlapping.

5. The network node of claim 1, wherein the first subset and the second subset are partly but not fully overlapping.

6. The network node of claim 1, wherein the first subset and the second subset are fully overlapping.

7. The network node of claim 1, wherein the reference signals are transmitted in both the first subset and the second subset during each of the two beam sweeps.

8. The network node of claim 1, wherein the first subset is angularly composed of every second beam in the set of direction beams and the second subset is composed of all remaining beams in the set of direction beams.

9. The network node of claim 1, wherein the reference signals are transmitted in only the first subset during a first beam sweep of the two consecutive beam sweeps and the reference signals are transmitted in only the second subset during a second beam sweep of the two consecutive beam sweeps.

10. The network node of claim 1, wherein the beam selection process involves at least a further consecutive beam sweep to be performed using the set of direction beams, wherein said at least further consecutive beam sweep occurs after a second beam sweep of the two consecutive beam sweeps, and wherein during said at least further consecutive beam sweep the reference signals are transmitted in only the second subset.

11. The network node of claim 10, wherein the processing circuitry further is configured to cause the network node to:

obtain information of time-varying polarization fading in a radio propagation environment between the network node and user equipment intended to receive the reference signals, and wherein during how many further consecutive beam sweeps the reference signals are transmitted in only the second subset depends on how fast the time-varying polarization fading varies in the radio propagation environment.

12. The network node of claim 1, wherein one of the beams in the set of direction beams is a currently used beam for communication with user equipment served by the network node, the second subset comprises less number of beams than the first subset, and the second subset overlaps with the first subset for the currently used beam and for beams angularly adjacent to the currently used beam.

13. The network node of claim 1, wherein the processing circuitry further is configured to cause the network node to:

receive reports from user equipment served by the network node of the reference signals; and determine polarization and directional beam to be used during exchange of data and/or control signalling with the user equipment until a next occurrence of the beam selection process is performed.

14. The network node of claim 13, wherein both polarization and beam as determined for a first user equipment differ from polarization and beam as determined for a second user equipment.

15. The network node of claim 1, wherein the processing circuitry further is configured to cause the network node to:

receive, from user equipment served by the network node, reports of reference signals having previously been transmitted by the network node, and wherein which of the directional beams to be included in the first subset of the directional beams and which of the directional beams to be included in the second subset of the directional beams are determined based on the reports.

16. A method for performing a beam selection process, the method being performed by a network node, the method comprising:

transmitting reference signals during the beam selection process, wherein the beam selection process involves two consecutive beam sweeps to be performed using a set of direction beams, during each of the two consecutive beam sweeps the reference signals are sequentially transmitted in the set of direction beams as the directional beams are swept, and during the two consecutive beam sweeps, the reference signals are in a first subset of the directional beams transmitted with a first polarization, and the reference signals are in a second subset of the directional beams transmitted with a second polarization.

17. A non-transitory computer readable storage medium storing a computer program for performing a beam selection process, the computer program comprising computer code which, when run on processing circuitry of a network node, causes the network node to:

transmit reference signals during the beam selection process, wherein the beam selection process involves two consecutive beam sweeps to be performed using a set of direction beams, during each of the two consecutive beam sweeps the reference signals are sequentially transmitted in the set of direction beams as the directional beams are swept, and during the two consecutive beam sweeps, the reference signals are in a first subset of the directional beams transmitted with a first polarization, and the reference signals are in a second subset of the directional beams transmitted with a second polarization.

* * * * *